US008023294B2

(12) United States Patent
Ryan et al.

(10) Patent No.: US 8,023,294 B2
(45) Date of Patent: Sep. 20, 2011

(54) NOISE REDUCTION SYSTEMS AND METHODS FOR UNSHIELDED COUPLING OF SWITCH MODE POWER SUPPLY

(75) Inventors: Paul Ryan, Huntingdon (GB); Joe Michael Leisten, Cambridge (GB)

(73) Assignee: Cambridge Semiconductor Limited (GB)

( * ) Notice: Subject to any disclaimer, the term of this patent is extended or adjusted under 35 U.S.C. 154(b) by 320 days.

(21) Appl. No.: 12/177,299

(22) Filed: Jul. 22, 2008

(65) Prior Publication Data
US 2009/0212754 A1   Aug. 27, 2009

(30) Foreign Application Priority Data

Feb. 21, 2008  (GB) .................... 0803183.3

(51) Int. Cl.
*H02M 1/12*   (2006.01)
*H02M 1/14*   (2006.01)
*G05F 1/32*   (2006.01)

(52) U.S. Cl. .......................... 363/40; 323/335
(58) Field of Classification Search .............. 323/251, 323/253, 254, 267, 332, 334, 335; 363/20, 363/21.01, 21.04, 21.07, 21.08, 21, 12, 21.15, 363/21.16, 39, 40, 65, 71; 307/83; 336/84 C, 336/185
See application file for complete search history.

(56) References Cited

U.S. PATENT DOCUMENTS

| | | | |
|---|---|---|---|
| 3,963,975 A * | 6/1976 | Gauper et al. ................ 363/15 |
| 4,625,270 A | 11/1986 | Taylor | |
| 5,107,411 A | 4/1992 | Misdom | |
| 5,724,236 A * | 3/1998 | Oglesbee ...................... 363/40 |
| 6,549,431 B2 | 4/2003 | Odell et al. | |
| 6,879,500 B2 * | 4/2005 | Liu et al. ...................... 363/40 |
| 7,123,121 B2 * | 10/2006 | Park ............................ 336/84 C |
| 7,164,338 B2 * | 1/2007 | Odell et al. ................... 336/181 |
| 7,570,497 B2 * | 8/2009 | Jacques et al. ............. 363/21.03 |
| 2008/0238375 A1 * | 10/2008 | Chen et al. ................... 323/234 |

FOREIGN PATENT DOCUMENTS

| | | |
|---|---|---|
| GB | 2448758 A | 10/2008 |
| JP | 59-129571 A | 7/1984 |
| JP | 07-045451 A | 2/1995 |
| WO | WO-03/098788 A1 | 11/2003 |

\* cited by examiner

*Primary Examiner* — Adolf Berhane
*Assistant Examiner* — Emily Pham
(74) *Attorney, Agent, or Firm* — Schwegman, Lundberg & Woessner, P.A.

(57) ABSTRACT

We describe a switch mode power supply having a power input, a switch, a transformer, and a power output. The transformer has a primary winding coupled to said power input via said switch, and a secondary winding coupled to said power output. The transformer further comprises an auxiliary winding and a coupling structure capacitively coupled to said secondary winding of said transformer; wherein said coupling structure does not comprise a shield or screen between said primary and secondary windings. The switch mode power supply further comprises a coupling capacitor connected between said coupling structure and said auxiliary winding to provide a noise suppression voltage from said auxiliary winding to said secondary winding to at least partially cancel a common mode noise voltage on said secondary winding from unshielded coupling from said primary winding.

17 Claims, 7 Drawing Sheets

NOISE REDUCTION SYSTEMS AND METHODS FOR UNSHIELDED COUPLING OF SWITCH MODE POWER SUPPLY

RELATED APPLICATION

This application claims priority under 35 U.S.C. 119 to United Kingdom Application No. 0803183.3, filed Feb. 21, 2008, which application is incorporated herein by reference and made a part hereof.

FIELD OF THE INVENTION

This invention relates to methods of reducing noise emissions or electromagnetic interference (EMI) in switch mode power supplies, and to switch mode power supplies embodying such techniques.

BACKGROUND TO THE INVENTION

Common mode noise propagation between primary and electrically-isolated secondary circuits in Switch Mode Power Supplies (SMPSs) has long been a problem. High frequency noise, or Electro-Magnetic Interference (EMI), generated by the switching transistor(s) in the primary circuit and the rectifier(s) in the secondary circuit are conducted, via primary-secondary stray capacitances, either back to the line supplying the SMPS, or into the load that it is powering. Such noise is also radiated and may adversely affect any sensitive nearby components and circuits. Strict conducted and radiated emissions standards must be complied with in marketed devices.

Stray capacitances between the primary-side and secondary-side circuits are predominantly associated with the isolating power transformer(s) but may also arise from other mechanisms. Examples include the structure of the switching power transistor that often gives a large area of radiating conductor which can couple to secondary-side conductors, and PCB conductor traces.

Methods to reduce interference generated by isolating switch mode power supplies, which apply to common-mode noise arising from capacitive coupling associated with the transformer and also to structures elsewhere in the power supply (e.g. electrodes of the power switch and PCB conductors), divide into three broad groups:
  Y-capacitors between primary-side and secondary-side to bypass the noise;
  Shields between primary-side and secondary-side circuits;
  Cancellation of residual signal.

Y-capacitors are effective but have technical shortcomings such as earth leakage current and behaviour in surge conditions. Hence there is a need for other low-cost techniques to deal with the residual noise.

Electrostatic shields provide a partial solution to the passage of noise via capacitive displacement currents through the stray capacitance coupling in the transformer. A shield is typically composed of either an incomplete turn of foil or a bobbin-width wire winding having a small number of turns, placed between primary and secondary windings. Common mode noise then couples across the winding-shield stray capacitance and returns to the circuit connected to the shield. However, even if multiple shields are connected to primary and secondary circuits, some residual noise signal remains.

Cancellation of residual noise signal has been attempted in various ways, with varying levels of success. For example a passive common mode noise reduction circuit is described in WO 03/098788. The previous attempts fall into the following categories:

1. Additional internal transformer structures. Examples include:
    a) Reducing a potential difference between primary and secondary shield windings (see, for example, JP 1995045451 Hitachi).
    d) Cancellation and balancing windings attached to the input and output windings, respectively (see, for example, U.S. Pat. No. 6,549,431 Power Integrations). Such additional structures typically add cost and bulk to the transformer, and may degrade other performance factors such as leakage inductance. Furthermore, optimisation of such structures for effective cancellation is often not straightforward.
2. Adaptations to transformer structures, such as matching voltage gradients in adjacent primary and secondary coil layers (see, for example, U.S. Pat. No. 5,107,411 Philips). These techniques tend to offer only modest improvements in noise rejection, and are difficult to optimise.
3. Partial coupling of inverse phase noise signals to the secondary winding:
    a) Using an amplifier connected to both primary and secondary circuits to generate a counteracting noise voltage, which cancels the residual noise voltage (see, for example, U.S. Pat. No. 6,879,500 University of Hong Kong).
    b) Using an auxiliary winding in opposite phase to the primary winding, and cancelling the residual noise voltage by driving a primary-secondary shield foil with this opposing phase auxiliary voltage, with a capacitor between the auxiliary winding and the shield (see, for example, U.S. Pat. No. 5,724,236 Motorola).
    c) Using an auxiliary winding in opposite phase to the primary winding, and using its signal to cancel the residual noise voltage by way of external components (U.S. Pat. No. 6,879,500).
    d) Using an auxiliary winding in opposite phase to the primary winding, with a 'Y-capacitor' between auxiliary and secondary circuits to inject an inverse phase noise signal directly into the secondary circuit (see, for example, U.S. Pat. No. 4,625,270 AT&T, and JP59129571 TDK).

In the approach taken in 3.b) above, as described in U.S. Pat. No. 5,724,236 (ibid), a cancellation signal can be applied to a main screen between primary and secondary windings. However this increases the impedance from the shield to the signal reference voltage (typically one or other pole of the high voltage supply). This is undesirable because it increases the impedance of the shield to the main noise current couping onto the shield (typically from the primary) and hence allows a small noise voltage to be present on the shield. This couples to the secondary via the mutual capacitance, so the shielding effectiveness is impaired.

SUMMARY OF THE INVENTION

According to the present invention there is therefore provided a method of reducing common-mode noise from unshielded coupling in a switch mode power supply; said switch mode power supply having a power input, a switch, a transformer, and a power output; said transformer having at least a primary winding on a primary side of said power supply and coupled to said power input via said switch, and a secondary winding of said transformer on a secondary side of said power supply and coupled to said power output; said noise from unshielded coupling comprising a noise voltage on a second of said windings coupled from a first of said windings, the method comprising: generating a noise suppression signal in antiphase to said noise from unshielded coupling using a voltage source comprising a winding of said transformer on a first one of said primary and secondary sides of said power supply; and coupling said noise suppression signal into said transformer using a coupling structure capacitatively coupled to a said winding of said transformer on the other one of said primary and secondary sides of said power supply; and wherein said coupling does not use a shield or screen between said primary and secondary windings of said transformer.

In embodiments the common mode noise comprises noise on a secondary winding of the transformer, more particularly a common mode noise voltage (rather than a voltage across terminals of the winding, the common mode noise voltage comprises a voltage on the winding as a whole with the voltage on the terminals of the winding varying together). This common mode noise voltage may be measured, for example, with reference to a common mode voltage on the primary winding (or vice versa) or with reference to a voltage on a screen or shield or with reference to an earth voltage. In embodiments the noise which is suppressed is residual noise which remains after shielding of the secondary from the primary side of the power supply, in particular after a screen or shield has been provided between the primary and secondary windings of the transformer.

In general the noise suppression signal will be generated from a primary side winding, conveniently an auxiliary winding of the transformer, and applied to a coupling structure which is capacitatively coupled to the secondary side of the transformer (although, in principle, the technique may be employed the other way around). Thus in embodiments the source of the noise suppression signal is provided by a winding (more) strongly coupled to the primary side than to the secondary side. It will be appreciated that the noise suppression signal need not be exactly in antiphase to the noise for the technique to reduce significantly the common mode noise. In preferred embodiments of the method the coupling structure is associated with the other (secondary) winding and is located on the opposite side of this winding to the first (primary) winding. Thus, more particularly, in preferred embodiments the coupling structure comprises an electrically conducting structure adjacent the secondary winding and on a further side of the secondary winding to that on which the primary winding is located, that is the primary side of the transformer used as a source for the noise suppression signal (from either a primary or an auxiliary winding).

In embodiments of the method the coupling structure may comprise an electrostatic shield wound outside the secondary winding prior to assembly of the core, or the coupling structure may comprise a flux band (wound around the whole transformer structure following assembly with the bobbin), or the coupling structure may comprise an unearthed element of the transformer core itself.

In some embodiments of the method the impedance of a coupling between the winding generating the noise suppression signal and the coupling structure provides part of the function of the noise suppression. Preferably this series impedance is provided by a capacitor, although an inductor and/or a resistor may additionally or alternatively be employed.

More particularly, as explained further later, a series impedance between the winding generating the noise suppression signal and the coupling structure may be made large in comparison to an impedance of the capacitance of the coupling structure to its associated winding, for example greater than two, five or ten times larger. Increasing the series impedance provides improved tolerance for variations in a capacitative coupling between the coupling structure and its associated (secondary) winding. If this is done, then the amplitude of the noise suppression signal should be correspondingly increased to maintain nominal cancellation.

Preferred embodiments of the method also comprise configuring lead out wires and/or windings of the transformer and/or other parts of the power supply to substantially maximise a separation between parts of the primary and secondary circuits that are not shielded from each other by an interwinding shield, for example to substantially maximise a separation between at least one lead out wire connected to the primary winding and at least one other lead out wire connected to the secondary winding. More particularly, by increasing such a physical separation between elements of the transformer and/or power supply the design may be made more tolerant to variations in physical dimensions and/or positions of such elements since such variations will represent a smaller proportion of the total separation, and hence unshielded coupling, and hence noise level variations between different instances of power supplies made to substantially the same design. For example a transformer winding may be made shorter than a bobbin width (and preferably then positioned symmetrically between the edges of the bobbin) to move an edge of the winding away from the primary and/or secondary side of the power supply, hence gaining increased tolerance to variations noise due to variations in the exact position and dimensions of the winding. Similarly in a multipin bobbin it is preferably to choose pins for connecting to the primary and secondary sides which are far apart.

The switch mode power supply may comprise a flyback type power supply, in which case the transformer acts as an energy transfer element. Embodiments of the method may also be employed with a forward converter type switch mode power supply (as well as other types of switch mode power supply), and in particular in a power supply in which the primary and secondary windings have the same polarity. In embodiments of the method the phase of the noise suppression signal need not correspond to the phase of the primary side switch (although the phase of the noise suppression signal should be substantially opposite to that of residual noise from unshielded coupling in the switch mode power supply, that is noise which remains after screening is applied within the power supply). For example, in a switch mode power supply with two primary side switches these may be configured to work in opposition, for example in a balanced design, so that self-cancelling of noise occurs at the transformer. In this case, the residual noise may be of one or opposite phase, in which case the cancellation voltage source has to be chose to match the phase of the actual residual noise. Embodiments of the method can nonetheless be employed to suppress or cancel residual noise from this technique.

In a related aspect the invention provides a switch mode power supply including a system for reducing common-mode noise from unshielded coupling in said switch mode power supply, said switch mode power supply having a power input, a switch, a transformer, and a power output, said transformer having at least a primary winding on a primary side of said power supply and coupled to said power input via said switch, and a secondary winding on a secondary side of said power supply and coupled to said power output, said noise from unshielded coupling comprising a noise voltage on a second of said windings coupled from a first of said windings, the system comprising: means for generating a noise suppression signal in antiphase to said noise from unshielded coupling using a voltage source comprising a winding of said transformer on a first one of said primary and secondary sides of said power supply; and means for coupling said noise suppression signal into said transformer using a coupling structure capacitatively coupled to a said winding of said transformer on the other one of said primary and secondary sides of said power supply; and wherein said coupling structure comprises an electrically conducting structure disposed: i) adjacent said winding of said transformer on said other one of said primary and secondary sides of said power supply, and ii) on a side of said winding of said transformer on said other one of said primary and secondary sides of said power supply other than a side adjacent said winding of said transformer on said first one of said primary and secondary sides of said power supply.

Features of the embodiments of the method described above may be incorporated within such a switch mode power supply.

In a further related aspect the invention provides a switch mode power supply having a power input, a switch, a transformer, and a power output, said transformer having at least a primary winding on a primary side of said power supply and coupled to said power input via said switch, and a secondary winding on a secondary side of said power supply and coupled to said power output; wherein said transformer further comprises an auxiliary winding and a coupling structure capacitatively coupled to said secondary winding of said transformer, wherein said coupling structure does not comprise a shield or screen between said primary and secondary windings, and wherein said switch mode power supply further comprises a coupling capacitor connected between said coupling structure and said auxiliary winding to provide a noise suppression voltage from said auxiliary winding to said secondary winding to at least partially cancel a common mode noise voltage on said secondary winding from unshielded coupling from said primary winding.

The skilled person will understand that, in embodiments, the auxiliary winding may comprise a tap on a primary winding of the transformer. Again features of embodiments of the methods described above may be incorporated into the switch mode power supply.

Embodiments of the switch mode power supply may further include means to limit the rate of change of a voltage on the primary side of the power supply including (but not limited to): a frequency control circuit to limit a maximum frequency of operation of the switch; a snubbing circuit; and a circuit to limit a slew rate of a primary side voltage at one or both of turn-on and turn-off of the switch, for example a dv/dt limiting circuit as described in our co-pending UK patent application number 0708198.7 filed on 27 Apr. 2007 (hereby incorporated by reference in its entirety).

BRIEF DESCRIPTION OF THE DRAWINGS

These and other aspects of the invention will now be further described, by way of example only, with reference to the accompanying Figures in which.

DETAILED DESCRIPTION OF PREFERRED EMBODIMENTS

Figure 1:
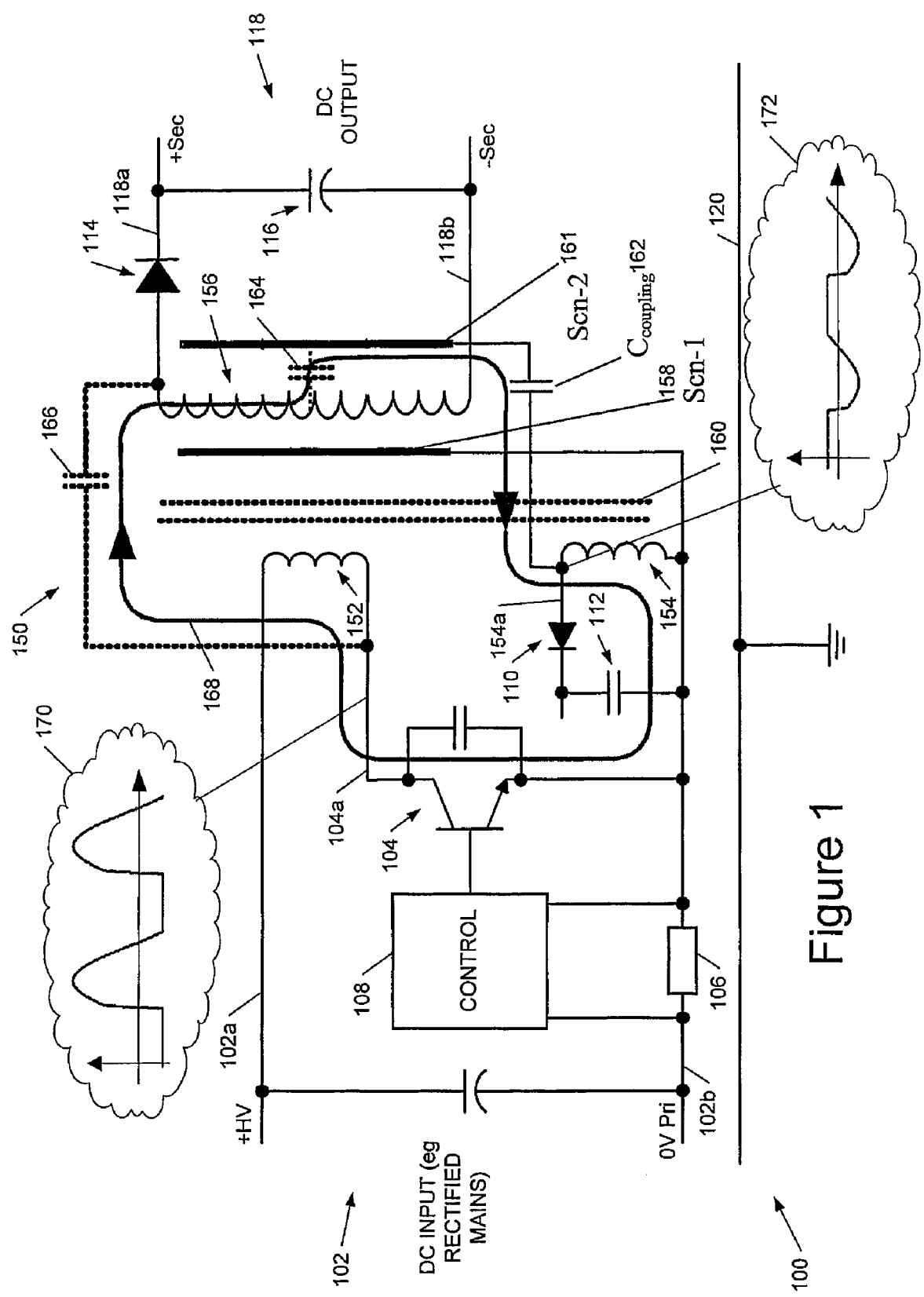
FIG. 1 shows a schematic diagram of a switch mode power supply in accordance with a first embodiment of the invention.

We will describe preferred embodiments of the invention implemented in switching power converters where the output is galvanically isolated from the power input. A common application is mains-powered low voltage DC supplies. Switching noise voltages caused by the power switch (or switches) can cause common-mode noise by capacitive coupling between the switching (input) circuits and the isolated output circuits. Embodiments of the invention can be applied to a wide variety of converter topologies including, but not limited to, flyback and forward converters.

Broadly speaking, embodiments of the present invention apply a cancellation signal to any convenient structure(s) other than a main inter-winding screen that is (are) capacitively coupled to the secondary winding, preferably in addition to such a main inter-winding screen. Examples include the transformer core itself and/or the flux band or another conductive shield associated with the secondary winding. We shall refer to such structures as "coupling structures". Common mode noise is thereby cancelled or substantially reduced without adding new structures inside the transformer, or any complex circuitry outside it. The magnitude of the cancellation voltage source and/or the characteristics of any series coupling impedance to the coupling structure can be adjusted to vary the amount of cancellation applied.

The cancellation voltage source can comprise any winding of appropriate polarity, i.e. in antiphase to the residual noise voltage, conveniently an auxiliary winding of opposite phase to the primary winding. Alternatively the cancellation voltage can be generated by a component external to the transformer, such as an amplifier. In power converters with single power switches, the residual noise is normally of the same phase as the high voltage AC present at the switch output. In these cases the cancellation voltage source should be of the opposite phase. However, where multiple power switches are used (operating on different phases), there will be a number of different noise voltage sources. Since they are synchronous there may be some inherent cancellation effect between them and the net residual noise may be of a range of phases. In this case the cancellation voltage source is generated with a phase to oppose the actual residual noise.

A particular advantage of embodiments of the invention is that, because fewer additional internal transformer structures are used for noise cancellation, the transformer performance is not degraded. Winding schemes can be optimised for the transfer of energy from line to load, rather than compromised by EMI considerations. For example in combination with the techniques we describe it may be sufficient to use a single primary-secondary foil shield to achieve a high level of EMI reduction. Connection between the cancellation voltage source, via a series impedance if desired, and the coupling structure is straightforward. Furthermore optimisation of noise signal cancellation can in many cases be achieved quickly and simply by adjusting the coupling impedance between the cancellation voltage source and the coupling structure.

In a typical off-line power converter, the principal source of residual noise signal comes from un-shielded coupling in the transformer (i.e. coupling effects which may be present despite any shielding present). However, there are often other mechanisms adding to residual noise. For example, the connection between the primary switch (or switches) and the transformer will have typically high noise voltages therefore small capacitances coupling from these conductors to the secondary side will add noise current to the residual noise signal. These noise currents can be reduced by careful layout of the converter and by additional electrostatic shields to intercept the current. However there may still be a significant contribution to the residual noise. The form of this noise is normally similar to that coupled through the transformer and can be cancelled or substantially reduced by using the same cancellation methods described here. Thus embodiments of the invention can be used to cancel or substantially reduce noise signals resulting from mechanisms external to the transformer.

It is useful for a stable voltage reference point to be established on each of the primary and secondary circuits of a switched mode power supply when determining the degree of coupling/noise cancellation to be applied. Such a reference point may be referred to as 'primary ground', 'primary quiet' or 'primary reference', with an equivalent(s) for the secondary circuit(s). For example, and depending heavily on the converter topology, such reference points could be at the 0 volts terminal of the primary circuit and at the output terminal of the secondary circuit that is not connected to the output rectifier. Ground earth may be defined as the potential of the surrounding environment. The safety earth connection of the mains supply or the ground terminal of a LISN (Line Impedance Stabilisation Network) used during test of the converter may be considered to be at ground earth potential.

To determine an optimum level of coupling of the cancellation voltage into the secondary circuit, the voltage between secondary reference point(s) and ground earth may be monitored. Any disturbing voltage between these points may then be minimised by adjusting the size of the cancellation voltage, the nature of the coupling structure, and/or the value of any coupling impedance between the cancellation voltage source and the coupling structure. In this way, noise currents flowing from the secondary circuit(s) through earth ground and back into the primary circuit(s) are reduced or nulled.

Alternatively the optimum level of coupling of the cancellation voltage into the secondary circuit may be determined by monitoring the voltage between the primary and secondary reference points, or by monitoring the current that flows in a connection between the LISN ground terminal and the secondary reference point.

Referring now to FIG. 1, this shows a switch mode power supply 100 configured to implement an embodiment of a method according to the invention. The skilled person will appreciate that the detailed form of the power supply is merely to provide a context for illustrating operation of an embodiment of the invention, and that other switch mode power supply topologies may equally well be employed.

As illustrated the power supply 100 comprises a DC voltage input 102, for example derived from an AC mains input and a rectifier stage to provide a high voltage DC supply. This power supply is applied to a primary winding 152 of a transformer 150 via a primary side switch 104, in the illustrated embodiment a bipolar transistor. (The capacitor across bipolar transistor is a feature of the power supply topology rather than of the illustrated embodiment of the invention; in the illustrated topology it resonates with magnetic and leakage inductance of the transformer). A return path is provided via a current sense resistor 106. A controller 108 controls switching of the switch 104 and an auxiliary winding 154 together with a rectifier 110 and smoothing capacitor 112 provides a low voltage DC power supply for controller 108. A secondary winding 156 of transformer 150 is coupled to an output stage comprising a rectifier 114 and smoothing capacitor 116 to provide a DC output 118. In embodiments the power supply may be proximal to an earth potential 120, for example coupled to an earth connection of an AC mains supply to the power supply 100. The earth potential 120 in FIG. 1 represents a voltage potential of the 'planet earth', and/or a LISN earth output that is usually connected to the power supply output during EMI test procedures.

The transformer 150 in the illustrated embodiment includes a screen 158 between the primary side and the secondary side of the transformer, more particularly between the primary and secondary windings of the transformer.

In the illustrated embodiment a second screen 161 is also provided, on the far side of the secondary winding from the primary winding side of the transformer. In embodiments this comprises a co-axial foil shield outside the secondary winding, and this serves as a coupling structure. In the illustrated embodiment this coupling structure 161 is coupled to the auxiliary winding 154 via a series impedance provided by a coupling capacitor 162. The screen 161 is capacitatively coupled to the secondary winding 156 and this capacitance 164 is shown dotted in the Figure. FIG. 1 also shows a parasitic capacitance at 166 between the primary and secondary sides of the transformer, and a core 160 of the transformer.

FIG. 1 further shows a path 168 of a current loop within the power supply which involves the parasitic capacitance 166 and the capacitance 164 between the coupling structure 161 and the secondary winding 156. The current in this loop comprises a residual common mode noise current which flows despite the presence of screen 158. Inset 170 shows a voltage waveform at a junction of the primary winding 152 and switch 104 and inset 172 shows a voltage waveform at the "live" end 154a of the auxiliary winding 154. It can be seen that these voltage waveforms are in antiphase and that therefore the coupling capacitor 162 injects a noise cancellation voltage into the side of secondary winding 156 opposite to the primary to cancel residual noise left over from the screening provided by grounded screen 158.

For closest coupling of cancellation voltage to secondary winding, the coupling structure comprises a co-axial foil shield placed to couple to the secondary winding, for example Scn-2 161 as shown in FIG. 1. Residual common mode noise currents are shown flowing from the primary side to the secondary side via the lumped parasitic capacitances between them. The stray capacitive coupling between Scn-2 161 and the secondary winding, shown in the Figure as a capacitor 164 (in dashed lines), provides a path for a cancellation current to be applied from the cancellation voltage source via the coupling impedance, here shown as series capacitance $C_{coupling}$ 162. Although a forward converter has been shown in FIG. 1, this is for illustration only and the invention can be used with any switching converter topology.

Figure 2:
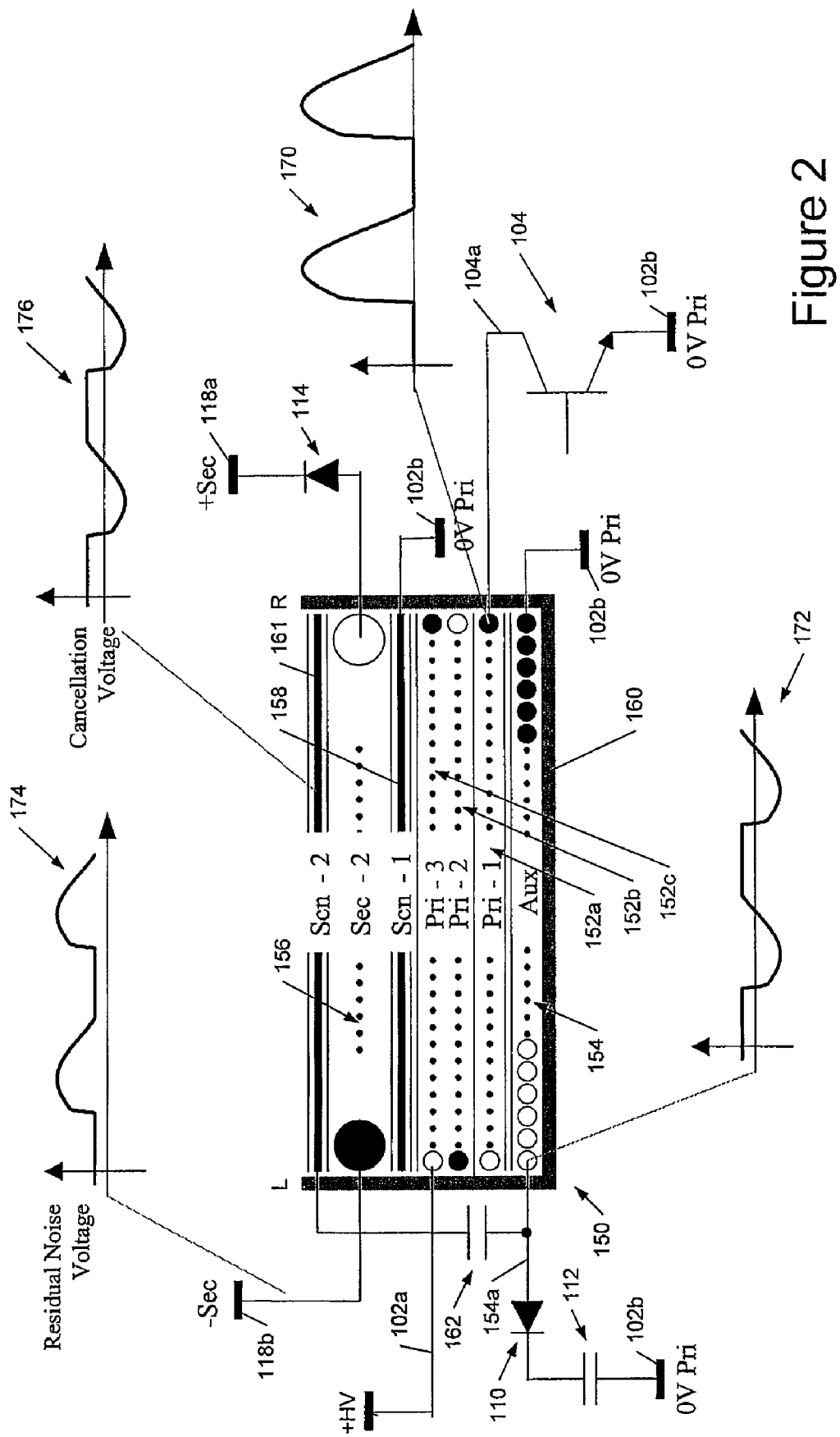
FIG. 2 shows details of construction of a transformer for the switch mode power supply of FIG. 1, and example waveforms illustrating operation of the power supply.

Referring now to FIG. 2, in which like elements to those of FIG. 1 are indicated by like reference numerals, this shows details of a construction of transformer 150. FIG. 2 shows a cross section through a part of transformer 150; not shown in FIG. 2 (for clarity) is a mirror image half of the transformer cross section which would appear below the part of the cross section shown in FIG. 2. The open and dark circles in the cross section of transformer 150 follow a convention in which a dark, filled circle indicates a start position for putting a winding onto a bobbin of the transformer. Thus, for example, the auxiliary winding begins at the right hand edge of the transformer bobbin (R) and proceeds towards the left hand edge (L) of the transformer bobbin. As can be seen in the example of the auxiliary winding 154, six dark circles are used to indicate that, in this embodiment, the auxiliary winding comprises multiple (six) strands of wire all starting at substantially the same point (i.e. a multi-filar winding). In the illustrated example the primary winding 152 has multiple (three) layers, the layer closest to the middle of the bobbin in beginning on the right of the core, the next layer (after a layer of tape) beginning on the left of the core (where the previous layer finished), and the upper layer beginning on the right of the core. It will be understood, however, that all these windings are wound about the bobbin in the same direction. Screening layers 158, 161 are illustrated as foil which is preferred, though wound-wire shields could be employed. Screen 158 is connected to an electrically quiet point, for example a zero volts connection 102b on the primary side of the power supply. Screen 161 is connected to coupling capacitor 162.

The direction in which the windings on the transformer core progress affects the locations at which noise is present within the transformer 150: at the high voltage end 104a of switch 104, for example, there is a large, rapidly changing voltage (typically of order 10s of KHz) and this noise decreases right-to-left in the first primary winding layer 152a, and also from the first to the third primary winding layers 152a-c until it reaches the electrically quiet high voltage DC input line 102a. It is therefore advantageous to maintain a maximum practical separation between noisy line 104a and the secondary winding 156. It is desirable to minimise the conduction of high frequency currents to ground and screen 158 is not completely effective in achieving this. For example the innermost layer 152a of the primary winding tends to couple into the core 160 and thence to the secondary winding 156. These residual common mode noise currents can be at least partially neutralised by coupling an antiphase noise voltage from the live end 154a of the auxiliary winding 154, preferably via a coupling capacitor 162, to a further coupling structure, the illustrated embodiment screen 161. In FIG. 2 this residual noise voltage is shown, schematically, by waveform 174 and the noise cancellation voltage derived from the auxiliary waveform 172 is shown, schematically, by waveform 176.

Continuing to refer to FIG. 2, the particular auxiliary, primary, secondary and inner foil shield ("Scn-1" 158) structures are for illustration only. Embodiments of the invention can be used with any combination of windings, so long as there is sufficient capacitive coupling between the secondary winding and the coupling structure—in this case the outer foil shield Scn-2. Appropriate choice of the coupling capacitor $C_{coupling}$ and any further impedance components allows the optimum amount of coupling of the cancellation voltage to the secondary winding, via the coupling structure and its parasitic capacitance to the secondary winding. The sketches show residual in-phase noise voltage on the secondary winding, coupled from the primary winding and referred to ground earth, and the cancellation voltage on the coupling structure that is in opposite phase to it. When a suitable level of cancellation voltage is applied (determined, for example, experimentally), the residual in-phase noise voltage on the secondary winding, referred to ground earth, is significantly decreased or even completely cancelled.

Figure 3:
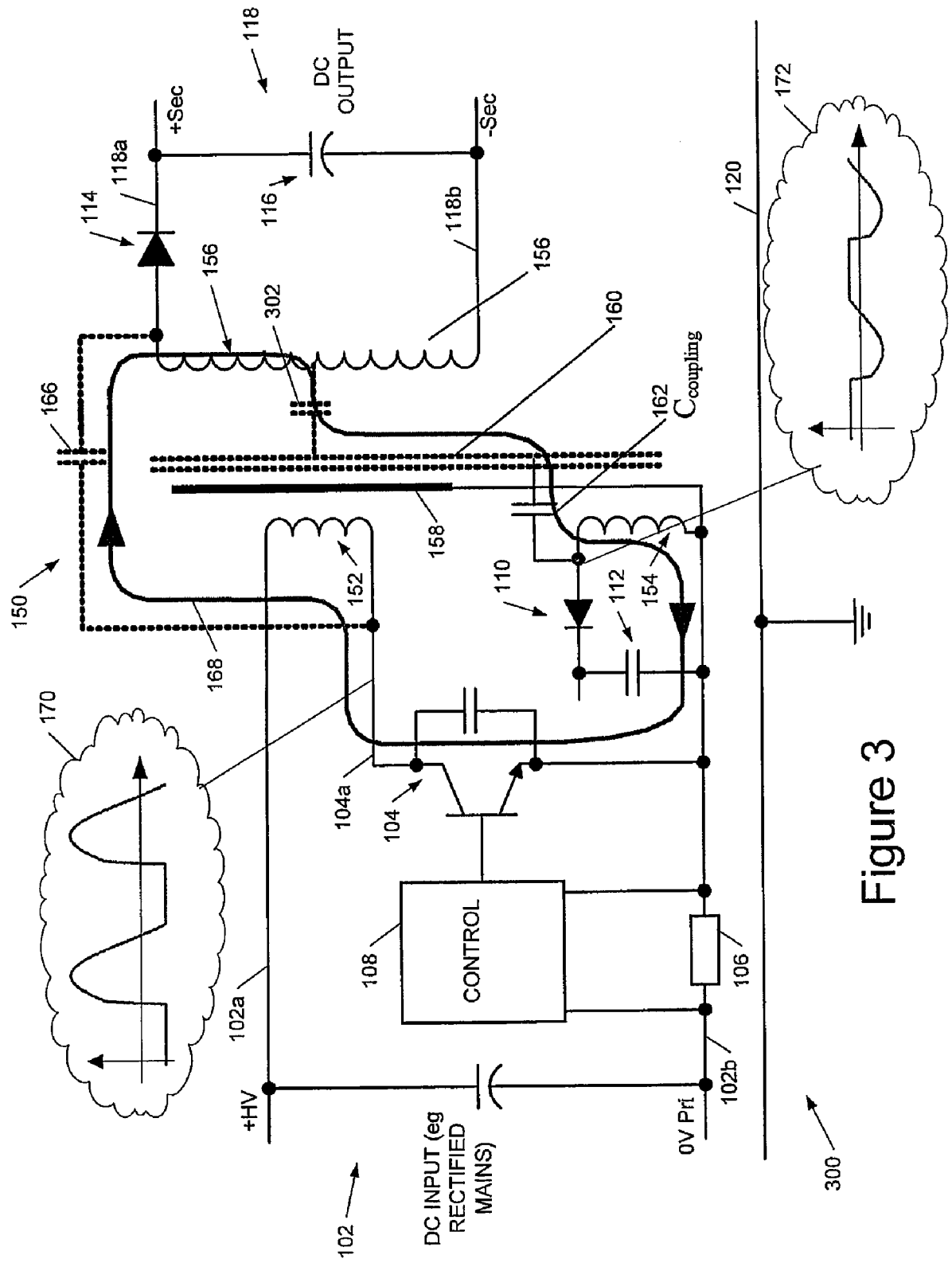
FIG. 3 shows a schematic diagram of a switch mode power supply in accordance with the second embodiment of the invention.

For some transformer designs there may be significant capacitive coupling between the secondary winding and the transformer core. FIG. 3 below shows an alternative embodiment 300 of the invention in which like elements to those previously described are again indicated by like reference numerals. In FIG. 3 the transformer core 160 serves as the coupling structure, being connected to the appropriately phased auxiliary winding via coupling capacitor 162, and supplying the cancellation voltage to the secondary winding via parasitic capacitance. In this embodiment the capacitive coupling between the transformer core and the secondary winding, shown in the Figure as a capacitor 302 in dashed lines, provides the path for a cancellation current to be applied from the cancellation voltage source via the coupling impedance, again shown as a series capacitance $C_{coupling}$. As in the previously described embodiment, the particulars of the windings and the converter topology shown are for illustration only. For effective operation of this embodiment, and of any others in which the transformer core is used as the coupling structure, the core or at least an element of the core serving as the coupling structure, should not be connected to ground earth or any other fixed reference point.

Figure 4:
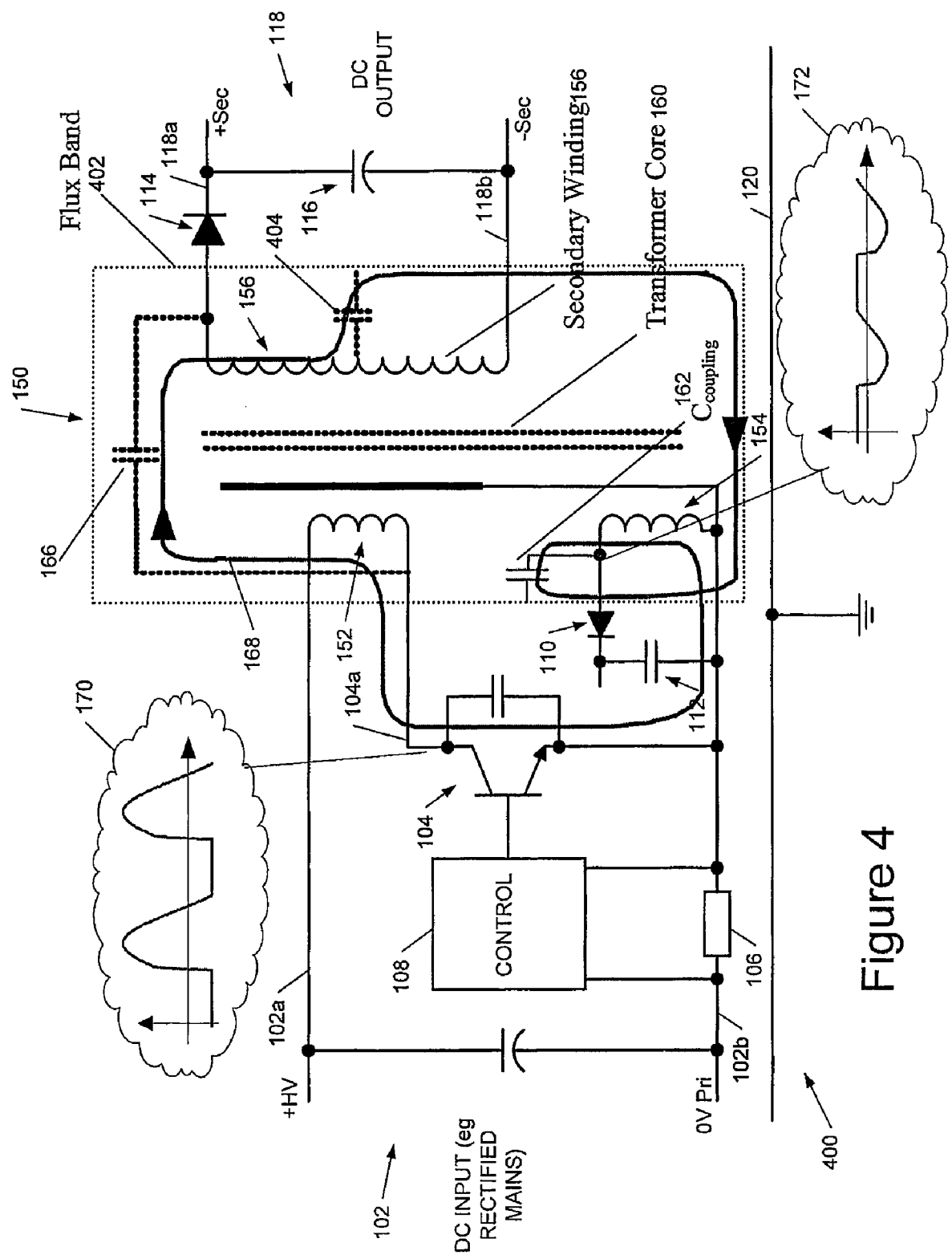
FIG. 4 shows a schematic diagram of a switch mode power supply in accordance with a third embodiment of the invention.

In some circumstances the preferred coupling structure will be outside the transformer structure itself, for instance there may be a flux band, also known as a flux strap, a belly band or a hum strap, around the transformer assembly. A third, preferred, embodiment 400, shown in FIG. 4, employs a flux band 402 that is capacitively coupled 404 to the secondary winding as the coupling structure. The flux band should be made of conductive material, such as copper tape, and may be either in electrical contact with the transformer core or isolated from it.

Figure 5A:
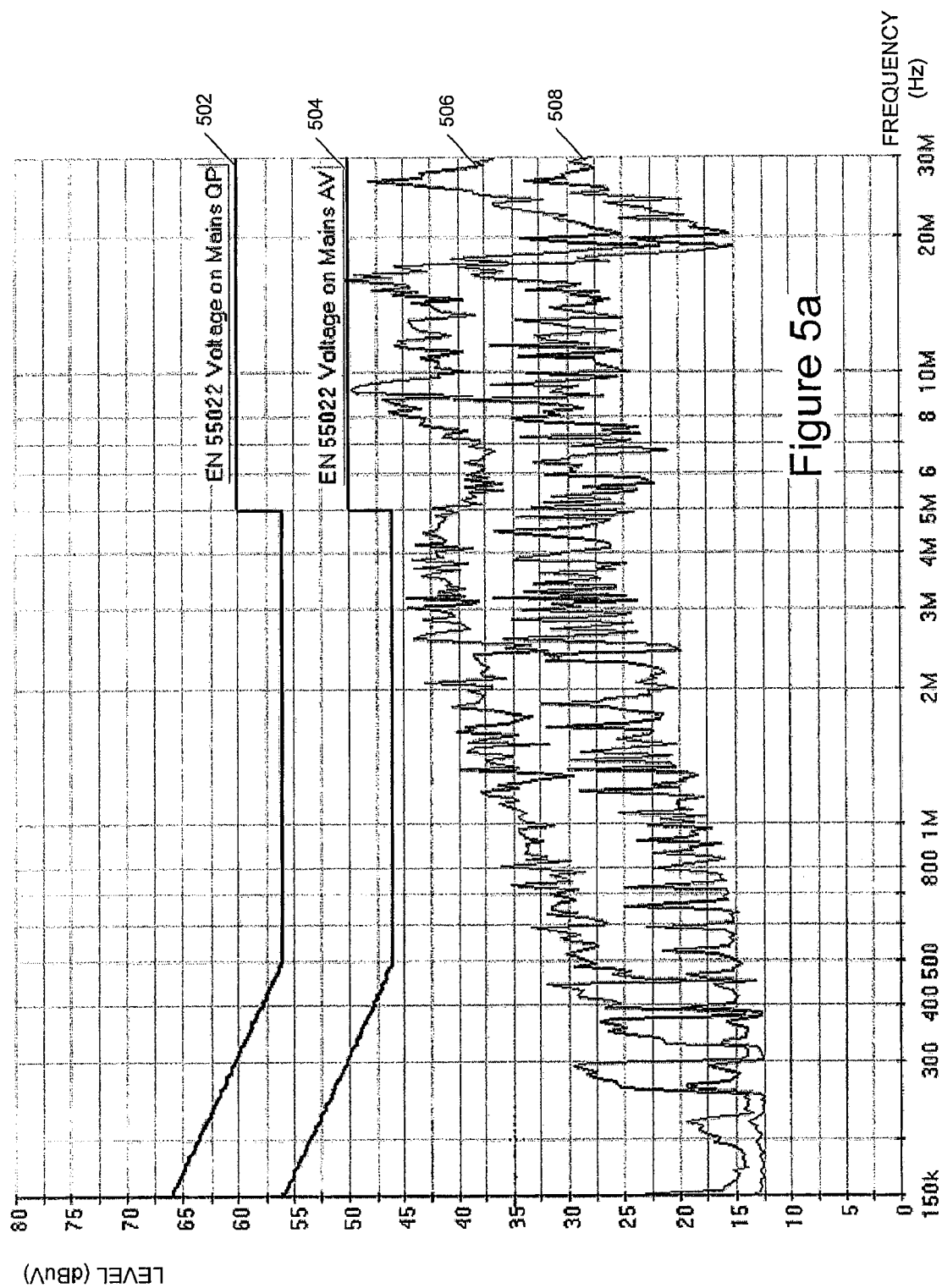
FIGS. 5a to 5c show, respectively, measured noise level signals from a switch mode power supply applying a noise suppression signal to a transformer flux band according to an embodiment of the invention, measured noise signals from the same power supply when the flux band is not driven with a noise suppression signal, and a cross section through a transformer with a flux band used in the power supply on which the measurements of FIGS. 5a and 5b were made.
Figure 5B:
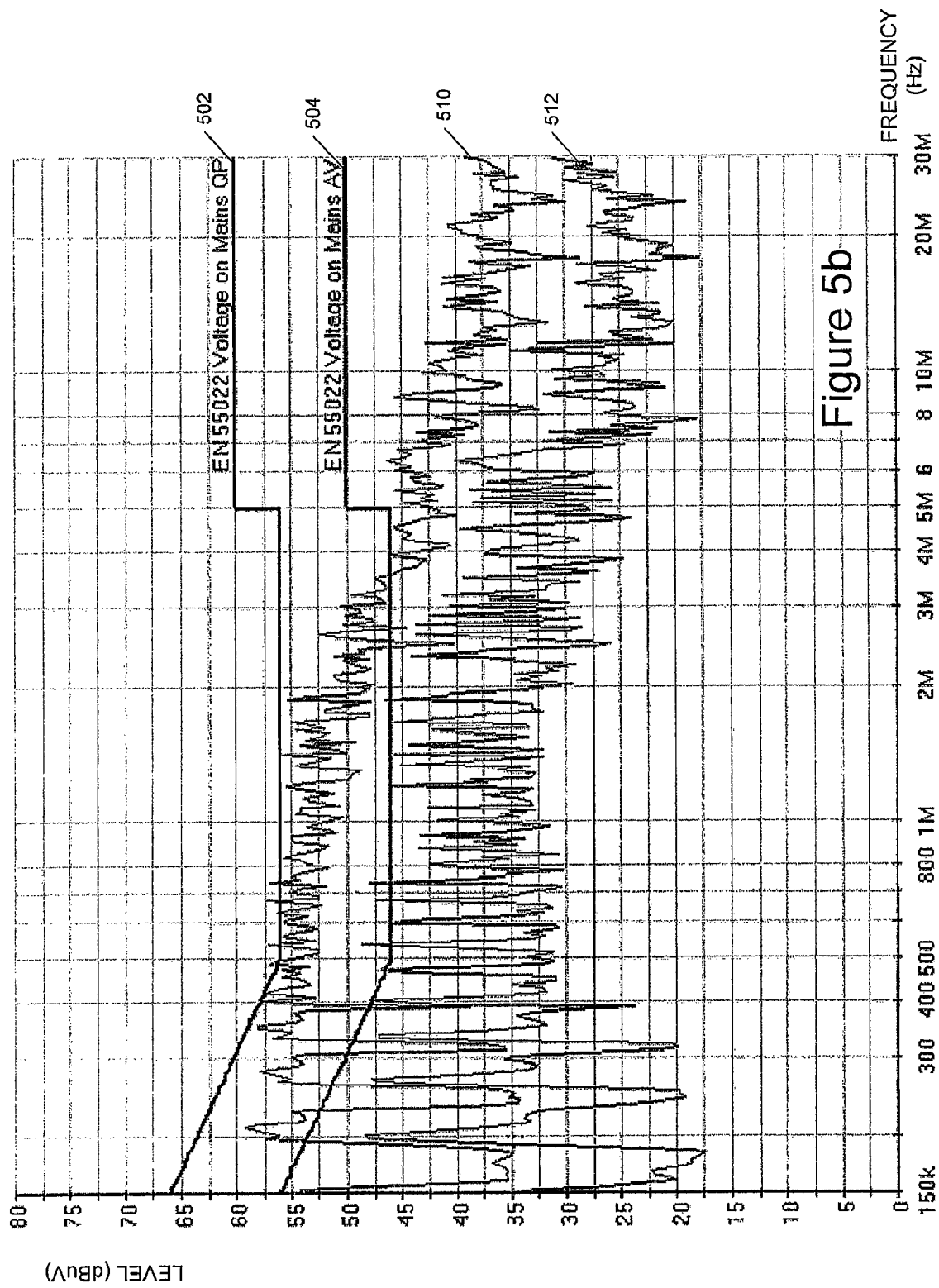
Figure 5C:
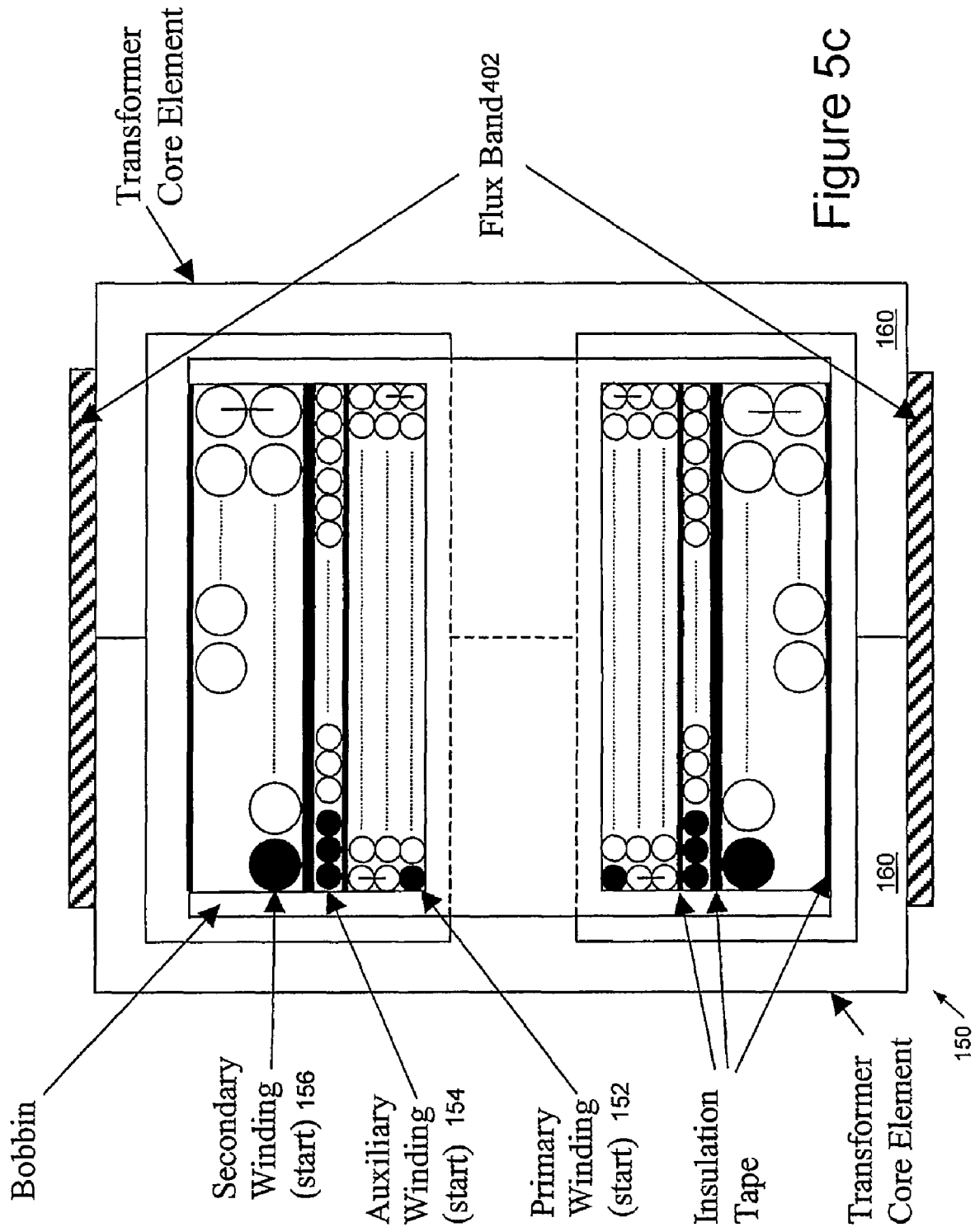

FIG. 5a shows a graph of measured noise level in dB µV against frequency in hertz showing a first regulatory limit according to EN standard EN55022 for noise measured according to a quasi-peak measurement technique (line 502); a second regulatory limit defined by EN55022 for noise measured according to an averaging technique (line 504), and corresponding quasi-peak 506 and average 508 noise level measurements for a switch mode power supply according to an embodiment of the invention having a capacitively driven flux band. FIG. 5b shows a similar graph with corresponding regulatory limits illustrating quasi-peak 510 and average 512 measured noise levels for the same power supply when the flux band is not driven. By comparing FIGS. 5a and 5b it can be seen that although at higher frequencies, for example above 10 MHz, the measured noise levels are similar, at lower frequencies, particularly below around 7 MHz, and especially below around 1 MHz the level of noise is substantially reduced, to many 10s of dB µV below the regulatory limits. FIG. 5c, in which like elements to those previously described are indicated by like reference numerals, shows a cross-section through a transformer used in the embodiment of the power supply on which the measurements were made.

The above described embodiments are also effective in reducing common mode noise current due to noise voltages generated by and across the secondary winding, acting via the capacitive coupling to a primary-connected screen. Such a noise voltage can be produced, for example, by a rectifier or switch in the circuit(s) connected to the secondary winding.

The above described embodiments use a source of cancellation voltage connected to the primary (input) side of the power converter, the coupling structure being capacitively coupled to the secondary side. However as a transformer winding is used as the source of cancellation voltage then it is also possible to locate this on or strongly couple this to the secondary (output) side of the converter, and use a coupling structure that is capacitively coupled to the primary side.

Embodiments of the invention aim to cancel or substantially reduce residual noise by applying an inverse noise signal, and hence the cancellation signal should be matched to the residual signal. However in cases where large numbers of power converters have to be manufactured, there will be variations (tolerances) of the residual signal and cancellation signal from example to example so the noise cancellation will be imperfect and the remaining noise may be too high. This can be corrected either by reducing the tolerance of the residual and cancellation signals or by adjusting either (or both) in individual examples to optimise cancellation. However adjusting each example of a product is expensive so it is preferable to minimise the variation of residual and cancellation signals.

In off-line supplies the main sources of noise are high AC voltages on the input side of the converter, and these couple to the secondary by small capacitances. The magnitude of these voltage sources is normally well controlled, though their rate of change may be less well controlled. Circuit techniques can be applied to limit and stabilise the rate of change including: frequency control, snubbing, and dV/dt control at turn-on and turn off. The effective residual coupling capacitances (i.e. those net of the effects of shields) will result from a variety of physical structures. Some coupling will be via long paths around the inter-winding shield. Dimensional variations will have little effect on these paths so, provided the surrounding materials are consistent, this coupling will have only a small tolerance. Other coupling will result from short paths but of small area, for example from the mutual proximity of lead-out wires from the transformer. Small dimensional changes in these could cause larger variations in the coupled noise. Hence it is preferable to maximise their separation distance even if this results in a larger effective electrode area. Similarly, for the coupling structure it is desirable to minimise the tolerance (variation) of the coupling. Where the coupling structure is a band or winding applied adjacent to the secondary, it is preferred to control the separation between the coupling structure and the secondary so that tolerance is small compared to the nominal value of the separation. This may entail setting a large nominal separation, and this in turn would reduce the capacitance of the coupling structure. To provide a desired level of cancellation current, a larger cancellation voltage might then be applied to the coupling structure.

It is possible to adjust the level of cancellation current by including a series impedance between the source of cancellation voltage and the coupling structure. The effect is to reduce the voltage on the coupling structure, due to the impedance of the coupling structure to other parts. If this impedance varies due to tolerances, there will be a corresponding change of cancellation voltage at the coupling structure. This may be desirable if the cause of the change of impedance of the coupling structure is change of capacitance to the secondary circuit. A higher capacitance causes a lower impedance, which reduces the voltage at the coupling structure, which will compensate for the increased capacitance (to some degree), hence stabilising the cancellation current applied to the secondary.

Broadly speaking we have described systems which apply a small "cancellation" signal that is opposite in phase to the residual noise signal to a coupling structure near the secondary winding and capacitively coupled to it. By optimising the magnitude and phase of the signal, and the strength of the coupling, the common mode noise signal between the converter input and output circuits can be substantially cancelled.

Such a cancellation signal can be derived most conveniently from an appropriately wound auxiliary winding. Suitable coupling structures include (but are not limited to): an electrostatic shield wound of foil or wire coaxially outside the secondary winding; an electrostatic foil shield wound around the outside of the transformer—also called a flux band; and the transformer core itself. The techniques we describe apply to all SMPS architectures. The driven flux band is preferred by the applications engineers, although sometimes the driven outer screen can be more convenient or reproducible to manufacture. Advantages of the techniques we describe include: a substantial reduction in EMI; fewer additional internal transformer structures, such as windings or shields, reducing costs and allowing design of the transformer to be optimised, potentially allowing more compact transformers to be used; avoidance of the use of expensive Y-capacitors; and simple optimisation of noise signal cancellation.

No doubt many other effective alternatives will occur to the skilled person. It will be understood that the invention is not limited to the described embodiments and encompasses modifications apparent to those skilled in the art lying within the spirit and scope of the claims appended hereto.

We claim:

1. A method of reducing common-mode noise from unshielded coupling in a switch mode power supply; said switch mode power supply having a power input, a switch, a transformer, and a power output; said transformer having at least a primary winding on a primary side of said power supply and coupled to said power input via said switch, and a secondary winding of said transformer on a secondary side of said power supply and coupled to said power output; said common-mode noise from unshielded coupling comprising a noise voltage on a second of said primary and secondary windings coupled from a first of said primary and secondary windings, the method comprising:

generating a noise suppression signal in antiphase to said noise from unshielded coupling using a voltage source comprising a winding of said transformer on a first power supply side that is one of said primary side and said secondary side of said power supply; and coupling said noise suppression signal into said transformer using a coupling structure capacitatively coupled to a winding of said transformer on a second power supply side that is the other one of said primary and secondary sides of said power supply, wherein the said winding on the second power supply side is the primary winding or the secondary winding; and wherein said coupling does not use a shield or screen between said primary and secondary windings of said transformer, and wherein said coupling structure is selected from a group consisting of: an electrostatic shield outside and adjacent said secondary winding, a flux band of said transformer, and an unearthed element of a core of said transformer.

2. A method as claimed in claim 1 wherein said coupling structure comprises an electrically conducting structure disposed i) adjacent said winding of said transformer on said second power supply side and ii) on a side of said winding of said transformer on said second power supply side other than a side adjacent said winding of said transformer on said first power supply side.

3. A method as claimed in claim 2 wherein said side of said winding of said transformer on said second power supply side is on a further side of said winding of said transformer on said second power supply side from said winding of said transformer on said first power supply side.

4. A method as claimed in claim 1 wherein said first power supply side comprises said primary side of said power supply, wherein said second power supply side comprises said secondary side of said power supply, and wherein said generating of said noise suppression signal uses a said voltage source comprising a winding on said primary side of said power supply, and wherein said coupling structure is capacitively coupled to a said winding on said secondary side of said power supply.

5. A method as claimed in claim 4 wherein said generating of said noise suppression signal uses a said voltage source which comprises an auxiliary winding of said transformer.

6. A method as claimed in claim 1 wherein said coupling of said noise suppression signal into said transformer comprises coupling via a series impedance.

7. A method as claimed in claim 1 wherein said coupling of said noise suppression signal into said transformer comprises coupling via a series impedance to compensate for variations in said capacitive coupling between said coupling structure and said winding on said second power supply side.

8. A method as claimed in claim 1 further comprising configuring one or more lead out wires of said transformer, or one or more windings of said transformer, or other elements of said power supply to increase a physical separation between said lead out wires, windings or other elements to reduce a variation in a level of said common mode noise from unshielded coupling due to tolerance variations in positions or dimensions of said lead out wires, windings or other elements.

9. A method as claimed in claim 1 wherein said switch mode power supply comprises a forward converter.

10. A switch mode power supply including a system for reducing common-mode noise from unshielded coupling in said switch mode power supply, said switch mode power supply having a power input, a switch, a transformer, and a power output, said transformer having at least a primary winding on a primary side of said power supply and coupled to said power input via said switch, and a secondary winding on a secondary side of said power supply and coupled to said power output, said noise from unshielded coupling comprising a noise voltage on a second of said windings coupled from a first of said windings, the system comprising:
   means for generating a noise suppression signal in antiphase to said noise from unshielded coupling using a voltage source comprising a winding of said transformer on a first power supply side this is one of said primary side and said secondary side of said power supply; and
   means for coupling said noise suppression signal into said transformer using a coupling structure capacitatively coupled to a winding of said transformer on a second power supply side this is the other one of said primary side and said secondary side of said power supply, wherein the said winding on the second power supply side is the primary winding or the secondary winding; and
   wherein said coupling structure comprises an electrically conducting structure disposed: i) adjacent said winding of said transformer on said second power supply side, and ii) on a side of said winding of said transformer on said second power supply side other than a side adjacent said winding of said transformer on said first power supply side, and
   wherein said coupling structure is selected from a group consisting of: an electrostatic shield outside and adjacent said secondary winding, a flux band of said transformer, and an unearthed element of a core of said transformer.

11. A switch mode power supply as claimed in claim 10 wherein said side of said winding of said transformer on said second power supply side is on a further side of said winding of said transformer on said second power supply side from said winding of said transformer on said first power supply side.

12. A switch mode power supply as claimed in claim 10 wherein said first power supply side comprises said primary side of said power supply, wherein said second power supply side comprises said secondary side of said power supply, and wherein said voltage source comprises an auxiliary winding of said transformer.

13. A switch mode power supply having a power input, a switch, a transformer, and a power output, said transformer having at least a primary winding on a primary side of said power supply and coupled to said power input via said switch, and a secondary winding on a secondary side of said power supply and coupled to said power output; wherein said transformer further comprises an auxiliary winding and a coupling structure capacitively coupled to said secondary winding of said transformer,
   wherein said coupling structure is selected from a group consisting of: an electrostatic shield outside and adjacent said secondary winding, a flux band of said transformer, and an unearthed element of a core of said transformer and does not comprise a shield or screen between said primary and secondary windings, and wherein said switch mode power supply further comprises a coupling capacitor connected between said coupling structure and said auxiliary winding to provide a noise suppression voltage from said auxiliary winding to said secondary winding to at least partially cancel a common mode noise voltage on said secondary winding from unshielded coupling from said primary winding.

14. A switch mode power supply as claimed in claim 13 wherein said coupling structure comprises an electrically conducting structure disposed adjacent said secondary winding of said transformer and on a further side of said secondary winding to said primary winding.

15. A switch mode power supply as claimed in claim 13 further comprising, in addition to said coupling structure, a shield or screen between said primary and secondary windings.

16. A switch mode power supply as claimed in claim 13 wherein said switch mode power supply is a forward converter and wherein said primary and secondary windings have the same polarity and said auxiliary winding has an opposite polarity to said primary and secondary windings.

17. A switch mode power supply as claimed in claim 13 further comprising means to limit the rate of change of a voltage on a primary side of said switch mode power supply.

* * * * *